Patented Jan. 4, 1927.

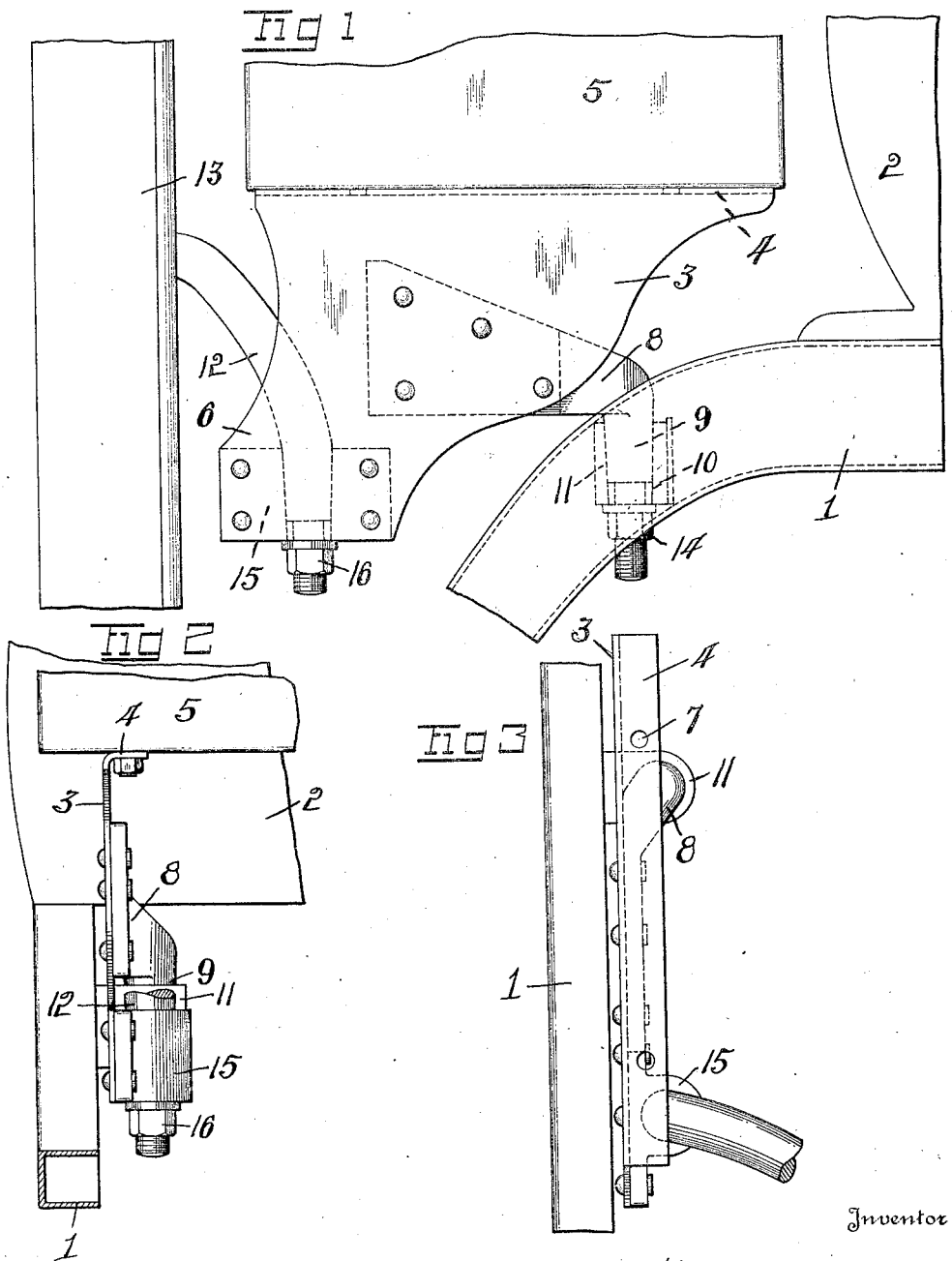

1,613,406

UNITED STATES PATENT OFFICE.

HOWARD MUNGER, OF FOSTORIA, OHIO, ASSIGNOR TO THE BRADLEY MOTOR PRODUCTS COMPANY, OF FOSTORIA, OHIO, A CORPORATION OF OHIO.

TRUNK RACK.

Application filed October 21, 1925. Serial No. 63,838.

This invention relates to a trunk rack of the type commonly used on the rear of automobiles, and combines both a trunk rack and a spare tire rack holder.

The object of the invention is the provision of a simple and inexpensive device of this character, which comprises a minimum number of parts and is capable of being easily and quickly attached to an automobile frame in place of the spare tire holder and then to itself carry the spare tire holder.

The invention is fully described in the following specification, and a preferred embodiment thereof illustrated in the accompanying drawings, in which,—

Figure 1 is a side elevation of the rear end portion of an automobile frame with the rack embodying the invention in position thereon and carrying the spare tire holder, with portions of some of the parts broken away. Fig. 2 is a rear fragmentary elevation thereof showing one side of the trunk rack in full and with the tire holder broken away, and Fig. 3 is a top plan view of one side member of the trunk rack with the frame member to which attached and the tire holder fragmentarily shown.

Referring to the drawings, 1 designates the rear end portion of the side frame bar of an automobile chassis, and 2 the rear portion of the automobile body.

The trunk rack embodying my invention comprises two side members 3 of plate-like form, which, for the purpose of lightness and cheapness of construction, are preferably stamped from sheet metal, and each has its upper edge formed with an inturned horizontal flange 4 forming a seat for a trunk 5 and being of suitable length for that purpose. It is not necessary to follow any particular form of configuration in the construction of the plates 3, it being only necessary to provide each plate with a top trunk seating portion of suitable length and with a downwardly extended portion 6 at its rear end. Each flange 4 is provided with holes 7 for receiving screws, bolts or other trunk holding means.

Each plate 3 is provided with a bracket arm 8, which, in the present instance, constitutes a casting that is riveted, bolted or otherwise suitably secured to the inner side of the plate projecting rearwardly therefrom, and is then angled downwardly to provide the vertical stud portion 9 for entering the socket 10 of a block 11 that is secured to and projects from the inner side of the rear end portion of the adjacent frame member 1. The blocks 11 are provided on some makes of automobiles for receiving the forwardly and downwardly directed arms 12 of a spare tire holder 13, and in such cases it is only necessary to remove the spare tire holder from such blocks and to insert the stud ends of the arms 8 of the respective trunk carrying plates 3. The studs 9 and sockets 10 are both tapered to have close-fitting engagement and the lower ends of the studs are projected below the sockets and threaded to have clamping nuts 14 secured thereon.

Each plate 3 is provided at the lower inner side portion 6 thereof with a block 15 corresponding in purpose to the blocks 11 and being socketed to receive the free ends of the tire holder carrying arms 12, which are secured therein by the nuts 16 in the same manner as they were secured in the blocks 11.

It is evident that the trunk holding rack embodying my invention comprises merely the plates 3, which are furnished in pairs of right and left members, and that these plates, through the medium of the angled arms 8 projecting therefrom, are secured to the frame bars of the automobile in place of and in the same manner as the arms 12 of the tire holder 13, and that the tire holder may then be carried by the plates 3 by inserting the ends of the arms 12 into socketed blocks 15. An important advantage of my trunk rack is that it constitutes merely two plates or members which may be purchased from automobile accessory dealers and quickly applied to automobiles of certain makes in place of the tire holder 13, and the tire holder then secured to the trunk rack members. Whenever it is desired to omit the trunk racks from the automobile, the side plates may be removed from the frame and the spare tire holder returned to its original position. This change can be made in a very few minutes.

I wish it understood that my invention is not limited to any specific construction, arrangement or form of the parts, as it is capable of numerous modifications and changes without departing from the spirit of the claim.

Having thus described my invention, what

I claim as new and desire to secure by Letters Patent is:

In combination with an automobile frame having side bars projecting rearwardly from the automobile body, a block secured to each side bar and having a vertically disposed socket, a vertically disposed plate adjacent each side bar having its upper portion formed to provide a trunk engaging part, each of said plates having a rear portion, a bracket secured to each plate and having its points of securement arranged to lie beneath the center of gravity of the trunk whereby to assume the weight of the latter, each bracket having a stud which extends downwardly from the bracket in the space between the rear portion of the plate and the front of the plate and which are receivable in the sockets of the respective blocks, a tire holder, downwardly projecting arms on the tire holder, a vertically socketed block secured to the rear portion of each plate, and separate means to hold the studs in the sockets.

In testimony whereof I have hereunto signed my name to this specification.

HOWARD MUNGER.